United States Patent
Wong et al.

(10) Patent No.: US 9,699,804 B2
(45) Date of Patent: Jul. 4, 2017

(54) METHODS AND SYSTEMS FOR SCHEDULING UNLICENSED BAND TRANSMISSIONS

(71) Applicants: Shin Horng Wong, Chippenham (GB); Teck Hu, Melbourne, FL (US)

(72) Inventors: Shin Horng Wong, Chippenham (GB); Teck Hu, Melbourne, FL (US)

(73) Assignee: Alcatel Lucent, Boulogne-Billancourt (FR)

(*) Notice: Subject to any disclaimer, the term of this patent is extended or adjusted under 35 U.S.C. 154(b) by 104 days.

(21) Appl. No.: 14/534,720

(22) Filed: Nov. 6, 2014

(65) Prior Publication Data

US 2016/0135212 A1 May 12, 2016

(51) Int. Cl.
| | |
|---|---|
| *H04W 72/12* | (2009.01) |
| *H04W 16/14* | (2009.01) |
| *H04W 28/16* | (2009.01) |
| *H04L 5/00* | (2006.01) |
| *H04W 28/26* | (2009.01) |
| *H04W 74/08* | (2009.01) |

(52) U.S. Cl.
CPC ......... *H04W 72/1273* (2013.01); *H04L 5/001* (2013.01); *H04W 16/14* (2013.01); *H04W 28/26* (2013.01); *H04W 72/1215* (2013.01); *H04W 72/1289* (2013.01); *H04W 72/12* (2013.01); *H04W 74/0808* (2013.01)

(58) Field of Classification Search
CPC ......... H04W 72/1273; H04W 72/1289; H04W 72/1215; H04W 16/14; H04W 28/26; H04W 74/0808; H04W 72/12; H04L 5/001

USPC .......................................................... 370/329
See application file for complete search history.

(56) References Cited

U.S. PATENT DOCUMENTS

| | | | |
|---|---|---|---|
| 2014/0003387 A1* | 1/2014 | Lee ................. | H04L 5/001 370/330 |
| 2014/0036853 A1* | 2/2014 | Kim ................ | H04W 16/14 370/329 |

(Continued)

FOREIGN PATENT DOCUMENTS

WO    WO 2016071763 A1 *    5/2016    ............ H04W 16/14

OTHER PUBLICATIONS

Alcatel-Lucent Shanghai Bell et al., "Considerations on LBT Enhancements for Licensed-Assisted Access," R1-144083, Oct. 5, 2014, 3GPP TSG RAN WG1 Meeting #78bis.*

(Continued)

*Primary Examiner* — Mark Rinehart
*Assistant Examiner* — Kenneth P Hunt
(74) *Attorney, Agent, or Firm* — Harness, Dickey & Pierce, P.L.C.

(57) ABSTRACT

At least one example embodiment discloses a system including a network element configured to transmit downlink control channel information to a user equipment (UE) using a first bandwidth, the first bandwidth being at least a portion of a long term evolution (LTE) bandwidth, transmit a preamble to the UE using a second bandwidth, the second bandwidth being a bandwidth excluding the LTE bandwidth, and the preamble indicating a scheduled data transmission, and transmit data to the UE using the second bandwidth in accordance with the downlink control channel information and the preamble.

22 Claims, 6 Drawing Sheets

(56) References Cited

U.S. PATENT DOCUMENTS

| | | | | |
|---|---|---|---|---|
| 2014/0036889 A1* | 2/2014 | Kim | .................... | H04L 1/1854 370/336 |
| 2014/0112289 A1* | 4/2014 | Kim | .................... | H04W 16/14 370/329 |
| 2015/0189574 A1* | 7/2015 | Ng | .................. | H04W 24/08 370/252 |
| 2016/0233989 A1* | 8/2016 | Belghoul | ............ | H04L 1/1887 |

OTHER PUBLICATIONS

World Intellectual Property Office "Written Opinion of the International Search Authority WO 2016071763 A1" May 12, 2016.*
Ericsson, Qualcomm, Huawei, Alcatel-Lucent. 3GPP TSG RAN Meeting #65 Study on Licensed-Assisted Access Using LTE. Sep. 9-12, 2014. Edinburgh, Scotland.
Alcatel-Lucent Shanghai Bell et al., "Considerations on LBT Enhancements for Licensed-Assisted Access," 3GPP TSG RAN WG1 Meeting #78bis, R1-144083, Ljubljana, Slovenia, Oct. 5, 2014.

* cited by examiner

FIG. 4

METHODS AND SYSTEMS FOR SCHEDULING UNLICENSED BAND TRANSMISSIONS

BACKGROUND

Long-Term Evolution (LTE)-Advanced provides a control channel known as the Physical Downlink Control Channel (PDCCH). Moreover, an Enhanced PDCCH may be provided.

RF communication may be regulated by a government entity such that the government entity controls which parties may use which frequency bands for communication. For example, in the US, the government has defined certain portions of the radio spectrum as being part of a licensed band while defining other portions of the radio spectrum as being part of an unlicensed band. Licensed bands are bands including radio frequencies which require an entity to obtain a license from the government before using the radio frequencies for communication. To the contrary, an entity may not require a special license to use radio frequencies within an unlicensed band for communications. In the US, an example of an unlicensed band is the known 5 GHz unlicensed band. In general, example uses of the licensed portions of the radio spectrum include use by wireless communications companies to provide wireless coverage for mobile devices, while example uses of the unlicensed portions of the radio spectrum include use by 802.11 (e.g., Wi-Fi) capable devices.

SUMMARY

At least one example embodiment discloses a method of scheduling a transmission of data. The method includes transmitting downlink control channel information to a user equipment (UE) using a first bandwidth, the first bandwidth being at least a portion of a long term evolution (LTE) bandwidth, transmitting a preamble to the UE using a second bandwidth, the second bandwidth being a bandwidth excluding the LTE bandwidth, and the preamble indicating a scheduled data transmission and transmitting the data to the UE using the second bandwidth in accordance with the downlink control channel information and the preamble.

In an example embodiment, the transmitting the downlink control channel information occurs before the transmitting the preamble.

In an example embodiment, the preamble indicates an orthogonal frequency-division multiplexing (OFDM) symbol for the scheduled data transmission.

In an example embodiment, the preamble indicates a starting symbol for the transmitting the data.

In an example embodiment, the preamble includes an end portion, the end portion indicating a next symbol as the starting symbol of the transmitting the data.

In an example embodiment, the transmitting transmits the data over a physical downlink shared channel (PDSCH) on the second bandwidth.

In an example embodiment, the method further includes selecting the preamble from a plurality of preambles, a number of the plurality of preambles being equal to a number of symbols in a subframe.

In an example embodiment, the method further includes performing a clear channel assessment (CCA) to determine if a channel on the second bandwidth is available, the transmitting the preamble being based on the performing.

In an example embodiment, the method further includes reserving the channel before the transmitting the preamble.

In an example embodiment, the transmitting the preamble occurs after the performing.

In an example embodiment, the method further includes reserving the channel if the preamble indicates a preceding OFDM symbol number in the subframe.

In an example embodiment, the transmitting the data transmits the data in a symbol corresponding to the OFDM symbol number of a next subframe.

At least one example embodiment discloses a method of scheduling a transmission of data including transmitting downlink control channel information to a user equipment (UE) using a first bandwidth, the downlink control channel information being in a long term evolution (LTE) format, transmitting a preamble to the UE using a second bandwidth, the second bandwidth being a bandwidth excluding an LTE bandwidth, and the preamble indicating a scheduled data transmission and transmitting the data to the UE using the second bandwidth in accordance with the downlink control channel information and the preamble.

At least one example embodiment discloses a system comprising a network element configured to transmit downlink control channel information to a user equipment (UE) using a first bandwidth, the first bandwidth being at least a portion of a long term evolution (LTE) bandwidth, transmit a preamble to the UE using a second bandwidth, the second bandwidth being a bandwidth excluding the LTE bandwidth, and the preamble indicating a scheduled data transmission, and transmit data to the UE using the second bandwidth in accordance with the downlink control channel information and the preamble.

In an example embodiment, the network element is configured to transmit the downlink control channel information occurs before transmitting the preamble.

In an example embodiment, the preamble indicates an orthogonal frequency-division multiplexing (OFDM) symbol for the scheduled data transmission.

In an example embodiment, the preamble indicates a starting symbol for the transmitting the data.

In an example embodiment, the preamble includes an end portion, the end portion indicating a next symbol as the starting symbol of the transmitting the data.

In an example embodiment, the network element is configured to transmit the data over a physical downlink shared channel (PDSCH) on the second bandwidth.

In an example embodiment, the network element is configured to select the preamble from a plurality of preambles, a number of the plurality of preambles being equal to a number of symbols in a subframe.

In an example embodiment, the network element is configured to perform a clear channel assessment (CCA) to determine if a channel on the second bandwidth is available, the transmitting the preamble being based on the performing.

In an example embodiment, the network element is configured to transmit the preamble after performing the CCA.

In an example embodiment, the network element is configured to reserve the channel before transmitting the preamble.

In an example embodiment, the network element is configured to reserve the channel if the preamble indicates a preceding OFDM symbol number in the subframe.

In an example embodiment, the network element is configured to transmit the data in a symbol corresponding to the OFDM symbol number of a next subframe.

At least one example embodiment discloses a system comprising a network element configured to transmit downlink control channel information to a user equipment (UE)

using a first bandwidth, the downlink control channel information being in a long term evolution (LTE) format, transmit a preamble to the UE using a second bandwidth, the second bandwidth being a bandwidth excluding an LTE bandwidth, and the preamble indicating a scheduled data transmission, and transmit data to the UE using the second bandwidth in accordance with the downlink control channel information and the preamble.

At least one example embodiment discloses a user equipment configured to receive downlink control channel information from a base station using a first bandwidth, the first bandwidth being at least a portion of a long term evolution (LTE) bandwidth, receive a preamble from the base station using a second bandwidth, the second bandwidth being a bandwidth excluding the LTE bandwidth, and the preamble indicating a scheduled data transmission, and receive data from the base station using the second bandwidth in accordance with the downlink control channel information and the preamble.

At least one example embodiment discloses a user equipment configured to receive downlink control channel information from a base station using a first bandwidth, the downlink control channel information being in a long term evolution (LTE) format, receive a preamble from the base station using a second bandwidth, the second bandwidth being a bandwidth excluding an LTE bandwidth, and the preamble indicating a scheduled data transmission, and receive data from the base station using the second bandwidth in accordance with the downlink control channel information and the preamble.

BRIEF DESCRIPTION OF THE DRAWINGS

Example embodiments will be more clearly understood from the following detailed description taken in conjunction with the accompanying drawings. FIGS. 1-4 represent non-limiting, example embodiments as described herein.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example: existing radio access network (RAN) elements, such as eNBs; and/or existing Evolved Packet Core (EPC) network elements, such as mobile management entities (MMEs), packet data network (PDN) gateways (PGWs), serving gateways (SGWs), servers, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "eNodeB" or "eNB" may be considered synonymous to, and may hereafter be occasionally referred to as a NodeB, base station, transceiver station, base transceiver station (BTS), etc., and describes a transceiver in communication with and providing wireless resources to users in a geographical coverage area. As discussed herein, eNBs may have all the functionality associated with conventional, well-known base stations in addition to the capability and functionality to perform the methods discussed herein.

The term "user equipment" or "UE" as discussed herein, may be considered synonymous to, and may hereafter be occasionally referred to, as user, client, mobile unit, mobile station, mobile user, mobile, subscriber, user, remote station, access terminal, receiver, etc., and describes a remote user of wireless resources in a wireless communications network.

As discussed herein, uplink (or reverse link) transmissions refer to transmissions from user equipment (UE) to eNB (or network), whereas downlink (or forward link) transmissions refer to transmissions from eNB (or network) to UE.

According to example embodiments, the PGWs, SGWs, MMEs, UEs, eNBs, etc. may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

In more detail, for example, a MME, PGW and/or SGW may be any well-known gateway or other physical computer hardware system. The MME, PGW and/or SGW may include one or more processors, various interfaces, a computer readable medium, and (optionally) a display device. The one or more interfaces may be configured to transmit/receive (wireline or wirelessly) data signals via a data plane or interface to/from one or more other network elements (e.g., MME, PGW, SGW, eNBs, etc.); and to transmit/receive (wireline or wirelessly) controls signals via a control plane or interface to/from other network elements.

The MME, PGW and/or SGW may execute on one or more processors, various interfaces including one or more transmitters/receivers connected to one or more antennas, a computer readable medium, and (optionally) a display device. The one or more interfaces may be configured to transmit/receive (wireline and/or wirelessly) control signals via a control plane or interface.

The eNBs, as discussed herein, may also include one or more processors, various interfaces including one or more transmitters/receivers connected to one or more antennas, a computer readable medium, and (optionally) a display device. The one or more interfaces may be configured to transmit/receive (wireline and/or wirelessly) data or controls signals via respective data and control planes or interfaces to/from one or more switches, gateways, MMEs, controllers, other eNBs, UEs, etc.

As discussed herein, the PGW, SGW, and MME may be collectively referred to as Evolved Packet Core network elements or entities (or core network elements or entities). The eNB may be referred to as a radio access network (RAN) element or entity.

At least some example embodiments disclose methods and systems for scheduling data transmissions that use an unlicensed band as a supplementary carrier over a Long Term Evolution (LTE) network.

Licensed bands for LTE may be found in 3GPP TS36.101 and 3GPP TS36.104, the entire contents of which are hereby incorporated by reference.

According to one or more example embodiments, the terms 'licensed' and 'unlicensed' as used herein with reference to radio spectrum, frequencies, or bands may refer, respectively, to licensed and unlicensed portions of the radio spectrum as defined by a national, regional and/or government organization including, for example, the US Federal Communications Commission (FCC), which defines the known 5 GHz unlicensed band as an unlicensed portion of the radio spectrum. Further, licensed portions of the radio spectrum are portions of the radio spectrum for which an entity (e.g., service provider or communications network operator) must obtain a license from a national, regional and/or government organization in order for the entity to use the portions of the radio spectrum; and unlicensed portions of the radio spectrum are portions of the radio spectrum that do not require an entity to obtain a license from a national, regional and/or government organization in order for the entity to use the portions of the radio spectrum.

Technologies other than Wi-Fi, such as Bluetooth, also use unlicensed bands.

Since the unlicensed band can be used by other technologies or License Assisted Access (LAA) by another operator, coexistence between different operators (of same or different technologies) is required. One such coexistence mechanism is Listen Before Talk (LBT). In LBT, every eNB senses the channel to determine whether the channel is busy before the eNB performs its transmission. If the channel is occupied, the eNB backoffs and tries again at another time.

One such LBT mechanism that is a potential candidate for LAA is the Load Based Equipment (LBE) scheme. In LBE, prior to a transmission, the eNB performs a Clear Channel Assessment (CCA) where the channel is observed for at least 20 µs to determine if it is occupied (i.e. energy detection). If the channel is busy, the eNB performs an Extended CCA (ECCA) where the eNB observes the channel for an N×CCA observation period, where N is random variable. The eNB can transmit if the channel is free during the ECCA observation period.

LTE transmission is scheduled by a central controller such as the eNB. Such centrally controlled scheduling, that is based on knowing precisely which resource (time and frequency) that will be used, is challenging in an unlicensed band since LBT makes it difficult for the eNB to determine when it can transmit a packet to a UE.

At least some example embodiments disclose a way for the eNB to indicate a starting point of PDSCH transmission to the UE in an unlicensed band.

Figure 1:
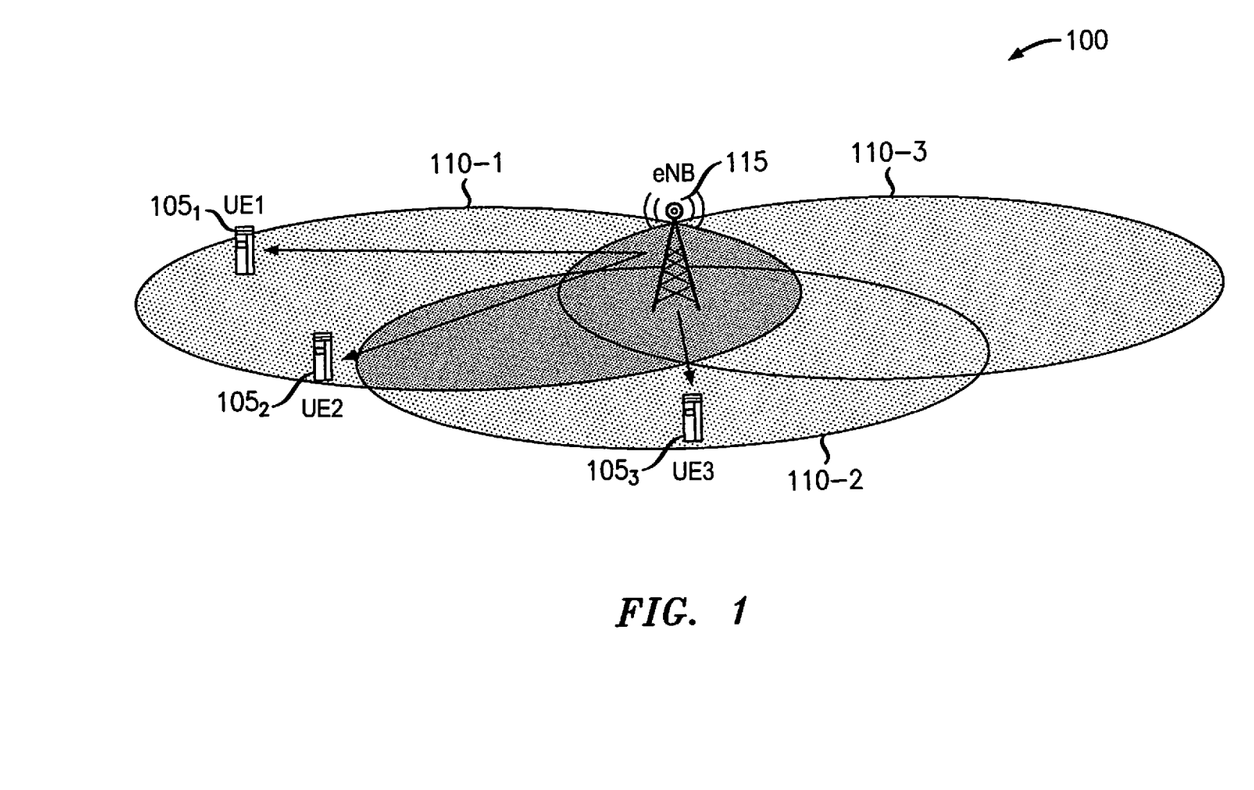
FIG. 1 illustrates a wireless communication network according to an example embodiment.

FIG. 1 illustrates a wireless communication network according to an example embodiment.

FIG. 1 illustrates a wireless communication network 100 including at least one eNodeB 115 which may communicate with an access gateway (not shown). The network may be a Long Term Evolution (LTE) network.

The access gateway is also communicatively coupled to a core network (CN) that is, in turn, communicatively coupled to one or more external networks, such as the Internet and/or other circuit and/or packet data networks. Based on this arrangement, the network 100 communicatively couples user equipments (UEs) $105_1$-$105_N$ to each other and/or to other user equipments or systems accessible via external networks.

As shown, the network 100 includes the eNB 115. However, it should be understood that the network 100 may include more than one eNB 115.

The eNB 115 provides the Evolved Universal Terrestrial Radio Access (E-UTRA) user plane (PDCP/RLC/MAC/PHY) and radio resource control (RRC) plane protocol terminations with user equipments (UEs) 105.

As discussed herein, the eNodeB 115 refers to a base station that provides radio access to UEs 105 within given coverage areas (e.g., 110-1, 110-2, 110-3). These coverage areas are referred to as cells. As is known, multiple cells can be associated with a single eNodeB.

In another embodiment, a single cell may be associated with a single eNB.

As discussed herein, base stations (e.g., eNodeB) may have all functionally associated with conventional, well-known base stations in addition to the capability and functionality to perform the methods discussed herein.

Moreover, the eNB 115 may communicate with the UEs $105_1$-$105_3$ using both licensed bands for LTE and unlicensed bands.

Figure 2A:
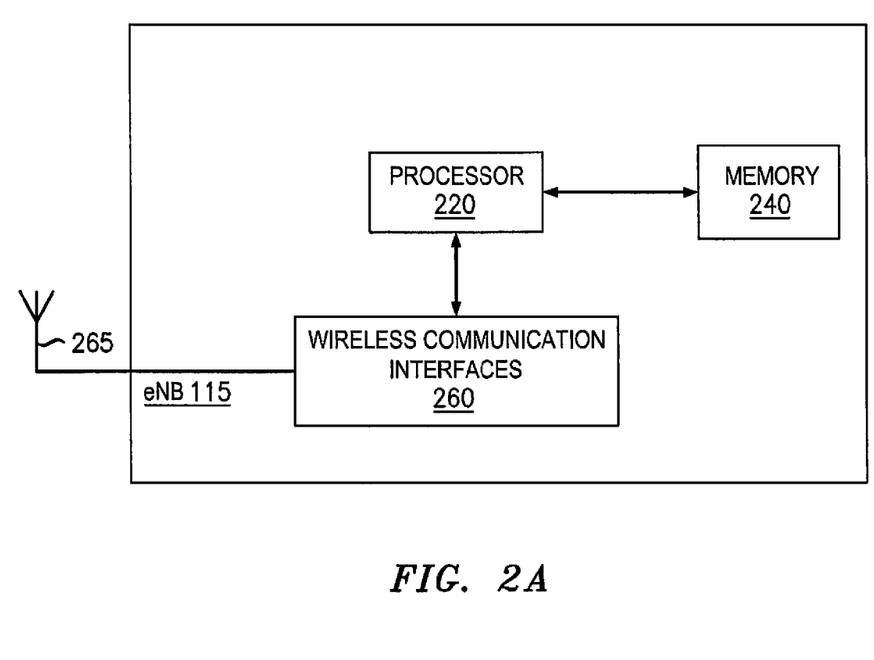
FIG. 2A illustrates an example embodiment of an eNB.

FIG. 2A illustrates an example embodiment of the eNB 115. As shown, the eNB 115 includes a processor 220, connected to a memory 240, various interfaces 260, and an antenna 265. As will be appreciated, depending on the implementation of the eNB 115, the eNB 115 may include many more components than those shown in FIG. 2A. However, it is not necessary that all of these generally conventional components be shown in order to disclose the illustrative example embodiment.

The memory 240 may be a computer readable storage medium that generally includes a random access memory (RAM), read only memory (ROM), and/or a permanent mass storage device, such as a disk drive. The memory 240 also stores an operating system and any other routines/modules/applications for providing the functionalities of the eNB 115 (e.g., functionalities of a base station, methods according to the example embodiments, etc.) to be executed by the processor 220. These software components may also be loaded from a separate computer readable storage medium into the memory 240 using a drive mechanism (not shown). Such separate computer readable storage medium may include a disc, tape, DVD/CD-ROM drive, memory card, or other like computer readable storage medium (not shown). In some example embodiments, software components may be loaded into the memory 240 via one of the various interfaces 260, rather than via a computer readable storage medium.

The processor 220 may be configured to carry out instructions of a computer program by performing the arithmetical, logical, and input/output operations of the system. Instructions may be provided to the processor 220 by the memory 240.

The various interfaces 260 may include components that interface the processor 220 with the antenna 265, or other input/output components. As will be understood, the interfaces 260 and programs stored in the memory 240 to set forth the special purpose functionalities of the eNB 115 will vary depending on the implementation of the eNB 115.

Figure 2B:
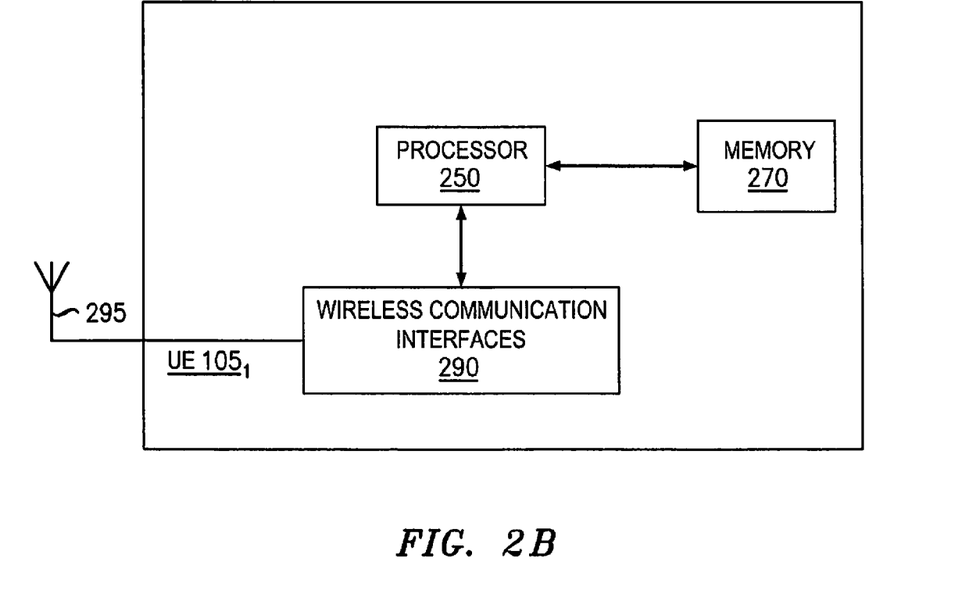
FIG. 2B illustrates an example embodiment of a UE.

FIG. 2B illustrates one example of the UE $105_1$. While only the UE $105_1$ is shown, it should be understood that the UEs $105_2$ and $105_3$ have a similar or same structure.

As shown, the UE $105_1$ includes a processor 250, connected to a memory 270, various interfaces 290, and an antenna 295. As will be appreciated, depending on the implementation of the UE $105_1$, the UE $105_1$ may include many more components than those shown in FIG. 2B. However, it is not necessary that all of these generally conventional components be shown in order to disclose the illustrative example embodiment.

The memory 270 may be a computer readable storage medium that generally includes a random access memory (RAM), read only memory (ROM), and/or a permanent mass storage device, such as a disk drive. The memory 270 also stores an operating system and any other routines/modules/applications for providing the functionalities of the UE $105_1$ (e.g., functionalities of a UE, methods according to the example embodiments, etc.) to be executed by the processor 250. These software components may also be loaded from a separate computer readable storage medium into the memory 270 using a drive mechanism (not shown). Such separate computer readable storage medium may include a disc, tape, DVD/CD-ROM drive, memory card, or other like computer readable storage medium (not shown). In some embodiments, software components may be loaded into the memory 270 via one of the various interfaces 290, rather than via a computer readable storage medium.

The processor 250 may be configured to carry out instructions of a computer program by performing the arithmetical, logical, and input/output operations of the system. Instructions may be provided to the processor 250 by the memory 270.

The various interfaces 290 may include components that interface the processor 250 with the antenna 295, or other input/output components. As will be understood, the interfaces 290 and programs stored in the memory 270 to set forth the special purpose functionalities of the UE $105_1$ will vary depending on the implementation of the UE $105_1$.

For the purposes of explanation only, at least some example embodiments will be described with respect to the Long Term Evolution (LTE) standard. Accordingly, the well-known terminology associated with LTE will be used describing the example embodiments.

Next, operation according to example embodiments will be described.

The eNB 115 may indicate to a UE (e.g., $105_1$) a starting point of PDSCH transmission to the UE in an unlicensed band. As will be described with reference to FIGS. 3A-3B, the eNB 115 may schedule the PDSCH transmission and then reserve the unlicensed band or reserve the unlicensed band and then schedule the PDSCH transmission.

Figure 3A:
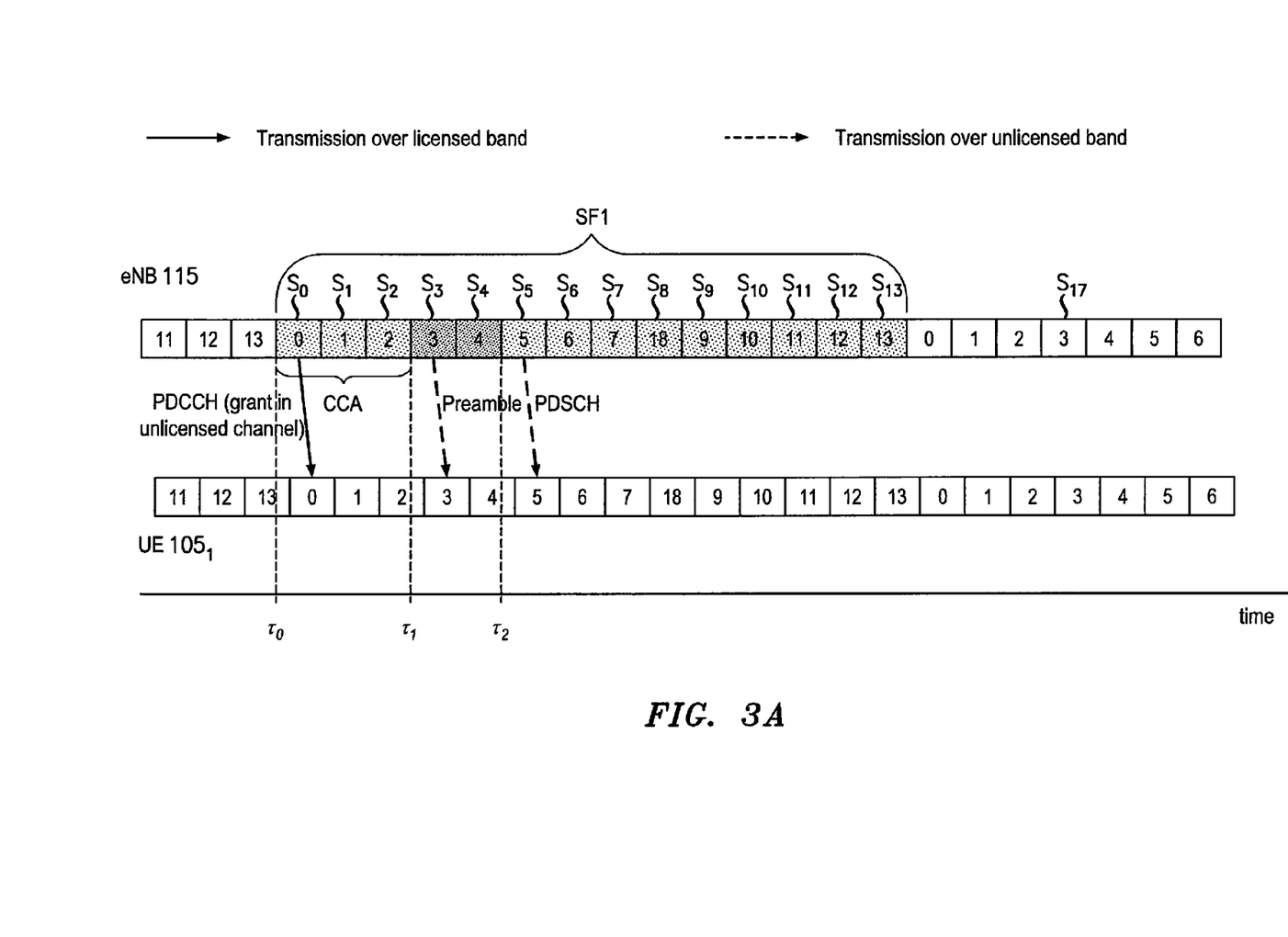
FIG. 3A illustrates a timing diagram of scheduling a physical downlink shared channel (PDSCH) transmission and then reserving the unlicensed band according to an example embodiment.

FIG. 3A illustrates a timing diagram of scheduling the PDSCH transmission and then reserving the unlicensed band according to an example embodiment.

As shown in FIG. 3A, the eNB 115 is configured to transmit control information and data across thirteen symbols $S_0$-$S_{13}$ in a subframe SF.

The eNB 115 may generate a set of 14 preambles. Each preamble is a unique sequence that indicates one of the symbols $S_0$-$S_{13}$ where the eNB 115 begins transmission of data in the unlicensed band. In other words, the sequence of the preamble is associated with a starting symbol. For example, "10101010101" may indicate starting at the OFDM symbol $S_0$ and "110011001100" for the OFDM symbol $S_1$. Each preamble can be one OFDM symbol in length, but occupies several subcarriers.

Thus, each preamble as a unique sequence where each sequence is associated to a starting symbol.

At time $\tau_0$, the eNB 115 decides to transmit downlink control information (DCI) via the PDCCH to the UE $105_1$ over the licensed band. The PDCCH schedules the PDSCH in the unlicensed band and instructs the UE $105_1$ to monitor the unlicensed band. In addition, the eNB 115 performs LBT using CCA to determine whether a channel over the unlicensed band is available.

At time $\tau_1$, the eNB 115 obtains the channel in the unlicensed band. As a result, the eNB 115 transmits one preamble within the set of preambles in the OFDM symbol $S_3$ (i.e. it is mapped in the frequency domain) to indicate that the eNB 115 will start the PDSCH in a certain OFDM symbol number. In the example shown in FIG. 3A, the preamble indicates that the eNB 115 will start the PDSCH at the OFDM symbol $S_5$. The eNB 115 may hold onto the channel by transmitting this preamble. In other words, the eNB 115 transmits the same preamble (i.e. the preamble the eNB selected in the OFDM symbol $S_3$ is also transmitted in the OFDM symbol $S_4$).

The preamble enables the eNB 115 to hold the channel and at the same time be useful for the UE $105_1$ that may be monitoring the channel.

In another example, the eNB 115 may use preambles having known endings. For example, the eNB 115 may transmit a preamble having a known ending to the UE $105_1$ that indicates that the PDSCH will start in the next OFDM symbol.

Once the UE $105_1$ detects the preamble indicating that the eNB 115 will start the PDSCH (e.g., transmitting data) at the OFDM symbol $S_5$, the UE $105_1$ prepares to receive on the PDSCH (e.g., synchronization and channel estimation) from the OFDM Symbol $S_5$. The UE $105_1$ discards any signal that the UE $105_1$ may have received in the OFDM symbol $S_3$ and OFDM Symbol $S_4$. In this way, the noise in the OFDM symbol $S_3$ and the OFDM symbol $S_4$ do not degrade the PDSCH decoding.

At time $\tau_2$, the eNB 115 starts transmitting on the PDSCH using the OFDM symbol $S_5$ and the UE $105_1$ starts receiving on the PDSCH.

In the example embodiment shown in FIG. 3A, the preamble indicates an OFDM symbol for PDSCH transmission that has not been transmitted. More specifically, the preamble is transmitted in OFDM symbol $S_3$ and indicates the OFDM symbol for PDSCH transmission is $S_5$. If the preamble indicates a preceding OFDM symbol or the current OFDM symbol, the eNB 115 may start the PDSCH in a same numbered OFDM symbol in a next subframe.

For example, if the eNB 115 transmits a preamble in the OFDM symbol $S_3$ to indicate that transmission of the PDSCH is scheduled for the OFDM symbol $S_3$, the eNB 115 initiates transmission on the PDSCH in a fourth OFDM symbol $S_{17}$ of a next frame.

Figure 3B:
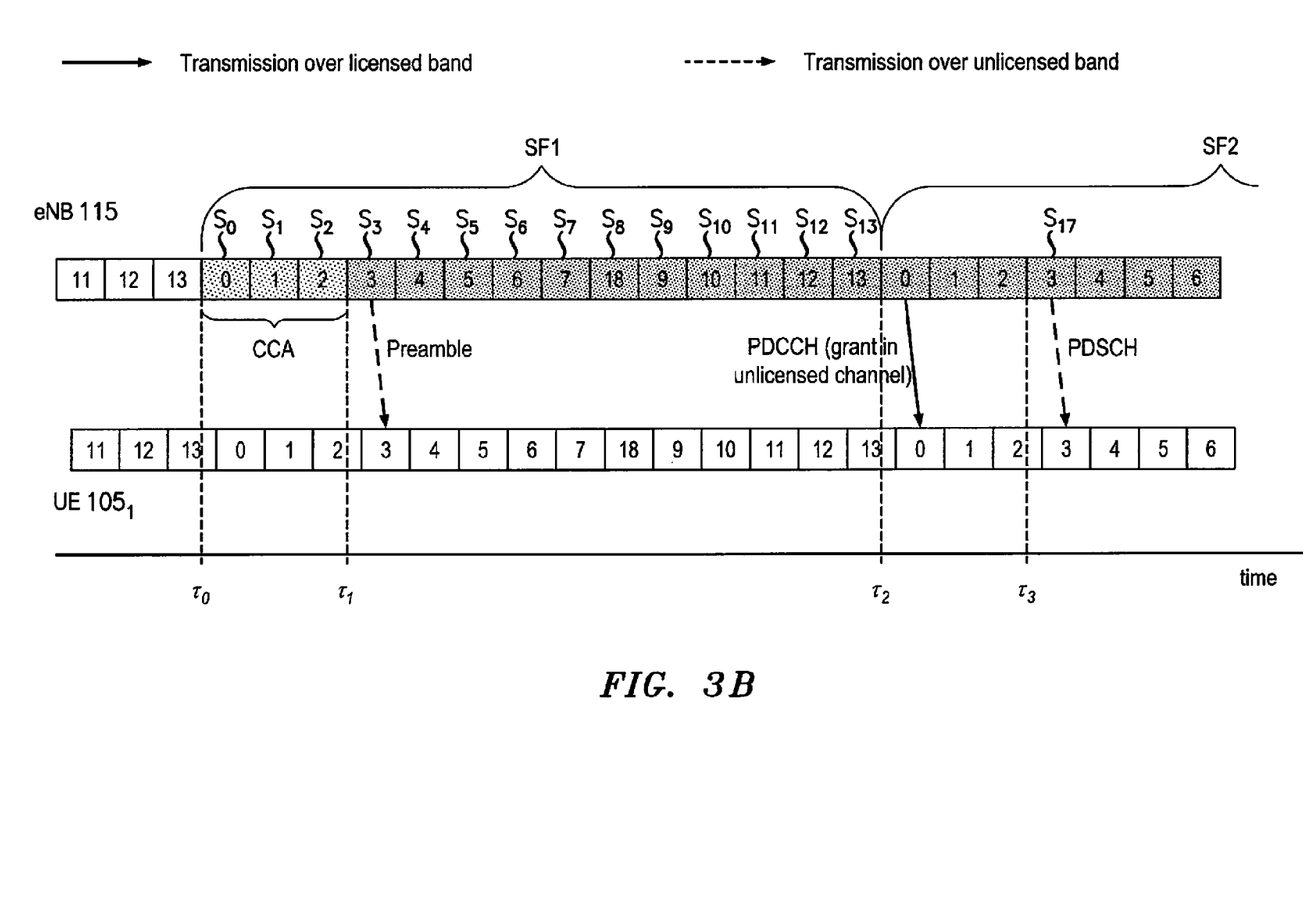
FIG. 3B illustrates a timing diagram of reserving an unlicensed band and then scheduling a PDSCH transmission according to an example embodiment.

FIG. 3B illustrates a timing diagram of reserving an unlicensed band and then scheduling a PDSCH transmission according to an example embodiment.

At time $\tau_0$, the eNB 115 performs LBT using CCA to obtain a channel in the unlicensed band.

At time $\tau_1$, the eNB 115 successfully obtains the channel in the unlicensed band. The eNB 115 then holds onto the channel by transmitting the preamble in a subframe SF1. As described above, the preamble indicates a start of PDSCH transmission. In this example, the eNB 115 uses a preamble to indicate the PDSCH transmission starts in the OFDM symbol $S_3$. Since the eNB 115 transmits the preamble at the OFDM symbol $S_3$, this means that the PDSCH will start in a next subframe SF2.

If the UE $105_1$ is monitoring the unlicensed channel at this point because the eNB 115 has previously instructed the UE $105_1$ to monitor it, the UE $105_1$ detects this preamble and prepares to buffer the next subframe for PDSCH.

At time $\tau_2$, i.e. the start of the next subframe SF2, the eNB 115 transmits downlink control information (DCI) via the PDCCH to the UE $105_1$ using the licensed band. The DCI gives the scheduling info of the PDSCH in the unlicensed band. Because the UE $105_1$ received the preamble indicating the start of the PDSCH, the UE $105_1$ knows which OFDM symbol to expect the PDSCH.

While FIG. 3B illustrates that the eNB 115 transmits the DCI via the PDCCH in the next subframe, the eNB 115 may reserve the channel for longer and wait for a later subframe to transmit the DCI.

It should be understood that example embodiments are not limited to PDCCH and EPDCCH can equally be used.

At time $\tau_3$, the eNB 115 transmits the scheduled PDSCH to the UE over the unlicensed band. More specifically, the eNB 115 transmits the scheduled PDSCH in the numbered OFDM indicated by the preamble. The preamble transmitted by the eNB 115 indicated that the PDSCH transmission would start in the fourth OFDM symbol, which is $S_{17}$ in the subframe SF2.

It should be understood that the use of the preambles allows the eNB 115 to decide whether to schedule the transmission and then reserve the unlicensed band or reserve the unlicensed band and then schedule the transmission. The eNB 115 may reserve the unlicensed channel first before scheduling if the eNB 115 determines the unlicensed channel is loaded and hence has a low probability of obtaining this channel quickly. On the other hand, the eNB 115 may wish to schedule the unlicensed channel first before reserving it if the eNB 115 determines it can obtain the unlicensed channel quickly, e.g., if the unlicensed channel is not loaded.

It should be understood that by having a variable holding period on the unlicensed band, the eNB 115 is given the flexibility in scheduling over the unlicensed band. As described, the eNB 115 is free to either reserve the unlicensed channel first then schedule the UE or schedule the UE then reserve the unlicensed channel.

Figure 4:
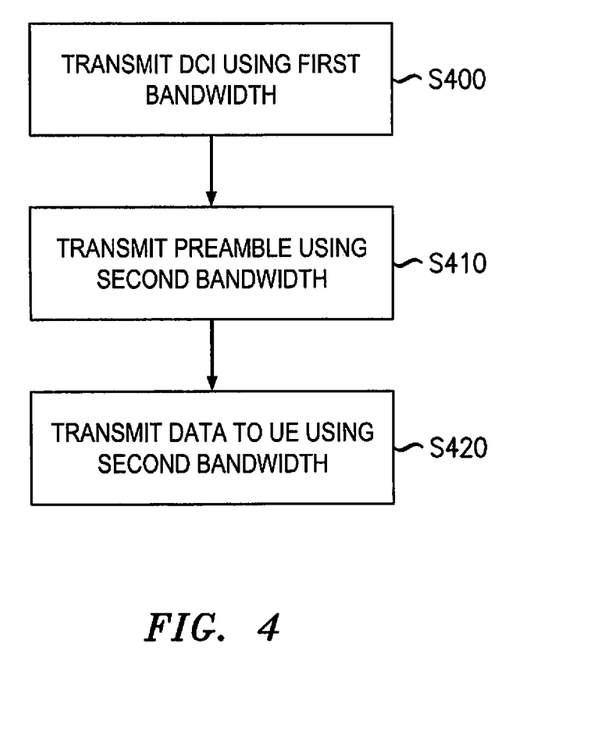
FIG. 4 illustrates a method of scheduling a transmission of data according to an example embodiment.

FIG. 4 illustrates a method of scheduling a transmission of data according to an example embodiment. It should be understood that the method of FIG. 4 may be implemented by the eNB 115 using the functionality described above.

At S400, the eNB transmits DCI to a UE using a first bandwidth. In an example embodiment, the first bandwidth may be at least a portion of the LTE licensed bandwidth. In another example embodiment, the first bandwidth may be outside the LTE licensed bandwidth, but the DCI is transmitted in LTE format. As described above, the eNB may transmit the DCI to the UE before or after the eNB obtains the channel in the unlicensed band.

At S410, the eNB transmits a preamble to the UE using a second bandwidth. The second bandwidth is an unlicensed bandwidth and excludes the LTE bandwidth. The preamble indicates a starting symbol for a scheduled data transmission. As described above, the preamble may be transmitted before or after the eNB has obtained the channel in the unlicensed band.

At S420, the eNB transmits the data to the UE using the second bandwidth in accordance with the DCI and the preamble. For example, if the preamble indicates that the eNB has scheduled transmission in OFDM symbol $S_5$, the eNB transmits the data over the PDSCH in the OFDM symbol $S_5$.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of scheduling a transmission of data, the method comprising:
    transmitting downlink control channel information to a user equipment (UE) using a first bandwidth, the first bandwidth being at least a portion of a long term evolution (LTE) bandwidth;
    selecting a preamble from a plurality of preambles, each of the plurality of preambles associated with a different symbol in a subframe;
    transmitting the selected preamble to the UE using a second bandwidth, the second bandwidth being a bandwidth excluding the LTE bandwidth, and the selected preamble indicating a scheduled data transmission; and
    transmitting the data to the UE using the second bandwidth in accordance with the downlink control channel information and the selected preamble.

2. The method of claim 1, wherein the transmitting the downlink control channel information occurs before the transmitting the selected preamble.

3. The method of claim 1, wherein the selected preamble indicates an orthogonal frequency-division multiplexing (OFDM) symbol for the scheduled data transmission.

4. The method of claim 3, wherein the selected preamble indicates a starting symbol for the transmitting the data.

5. The method of claim 4, wherein the transmitting transmits the data over a physical downlink shared channel (PDSCH) on the second bandwidth.

6. The method of claim 1, further comprising:
    performing a clear channel assessment (CCA) to determine if a channel on the second bandwidth is available, the transmitting the selected preamble being based on the performing.

7. The method of claim 6, further comprising:
    reserving the channel before the transmitting the selected preamble.

8. The method of claim 6, wherein the transmitting the selected preamble occurs after the performing the CCA.

9. The method of claim 6, further comprising:
    reserving the channel if the selected preamble indicates a preceding OFDM symbol number in the subframe.

10. The method of claim 9, wherein the transmitting the data transmits the data in a symbol corresponding to the OFDM symbol number of a next subframe.

11. The A method of scheduling a transmission of data, the method comprising:
    transmitting downlink control channel information to a user equipment (UE) using a first bandwidth, the first bandwidth being at least a portion of a long term evolution (LTE) bandwidth;
    transmitting a preamble to the UE using a second bandwidth, the second bandwidth being a bandwidth excluding the LTE bandwidth, and the selected preamble indicating a scheduled data transmission; and
    transmitting the data to the UE using the second bandwidth in accordance with the downlink control channel information and the preamble, wherein
    the preamble indicates an orthogonal frequency-division multiplexing (OFDM) symbol for the scheduled data transmission,
    the preamble indicates a starting symbol for the transmitting the data, and
    the preamble includes an end portion, the end portion indicating a next symbol as the starting symbol of the transmitting the data.

12. A system comprising:
    a network element configured to,
        transmit downlink control channel information to a user equipment (UE) using a first bandwidth, the first bandwidth being at least a portion of a long term evolution (LTE) bandwidth,
        transmit a preamble to the UE using a second bandwidth, the second bandwidth being a bandwidth excluding the LTE bandwidth, and the preamble indicating a scheduled data transmission, and
        transmit data to the UE using the second bandwidth in accordance with the downlink control channel information and the preamble, wherein the network element is configured to select the preamble from a plurality of preambles, each of the plurality of preambles associated with a different symbol in a subframe.

13. The system of claim 12, wherein the network element is configured to transmit the downlink control channel information before transmitting the selected preamble.

14. The system of claim 12, wherein the selected preamble indicates an orthogonal frequency-division multiplexing (OFDM) symbol for the scheduled data transmission.

15. The system of claim 14, wherein the selected preamble indicates a starting symbol for the transmitting the data.

16. The system of claim 15, wherein the network element is configured to transmit the data over a physical downlink shared channel (PDSCH) on the second bandwidth.

17. The system of claim 12, wherein the network element is configured to perform a clear channel assessment (CCA) to determine if a channel on the second bandwidth is available, the transmitting the selected preamble being based on the performing.

18. The system of claim 17, wherein the network element is configured to reserve the channel before transmitting the selected preamble.

19. The system of claim 17, wherein the network element is configured to transmit the selected preamble after performing the CCA.

20. The system of claim 17, wherein the network element is configured to reserve the channel if the selected preamble indicates a preceding OFDM symbol number in the subframe.

21. The system of claim 20, wherein the network element is configured to transmit the data in a symbol corresponding to the OFDM symbol number of a next subframe.

22. A system comprising:
a network element configured to,
  transmit downlink control channel information to a user equipment (UE) using a first bandwidth, the first bandwidth being at least a portion of a long term evolution (LTE) bandwidth,
  transmit a preamble to the UE using a second bandwidth, the second bandwidth being a bandwidth excluding the LTE bandwidth, and the preamble indicating a scheduled data transmission, and
  transmit data to the UE using the second bandwidth in accordance with the downlink control channel information and the preamble, wherein
the preamble indicates an orthogonal frequency-division multiplexing (OFDM) symbol for the scheduled data transmission,
the preamble indicates a starting symbol for the transmitting the data, and
the preamble includes an end portion, the end portion indicating a next symbol as the starting symbol of the transmitting the data.

* * * * *